(12) United States Patent
Stein et al.

(10) Patent No.: US 6,424,672 B1
(45) Date of Patent: Jul. 23, 2002

(54) DEVICE FOR PRODUCING SLAG IN AN ELECTRIC ARC FURNACE

(76) Inventors: Wilfried Stein, Tillmannsstrasse 19 a, D-58135 Hagen; Karl Stein, Bruckner Strasse 5, D-58097 Hagen, both of (DE)

( * ) Notice: Subject to any disclaimer, the term of this patent is extended or adjusted under 35 U.S.C. 154(b) by 0 days.

(21) Appl. No.: 09/674,965
(22) PCT Filed: Apr. 26, 1999
(86) PCT No.: PCT/EP99/02807
§ 371 (c)(1),
(2), (4) Date: Jan. 11, 2001
(87) PCT Pub. No.: WO99/58729
PCT Pub. Date: Nov. 18, 1999

(30) Foreign Application Priority Data

May 8, 1998 (DE) .......................... 198 20 589

(51) Int. Cl.$^7$ ............................................. F27D 23/04
(52) U.S. Cl. ............................................. 373/85; 373/2
(58) Field of Search .............................. 373/2, 60, 71, 373/75, 77, 80, 85

(56) References Cited

U.S. PATENT DOCUMENTS 3,459,867 A * 8/1969 Estes ............................ 373/85
4,827,486 A * 5/1989 Brotzmann et al. ........... 373/85
5,373,530 A * 12/1994 Perrin .......................... 373/85

FOREIGN PATENT DOCUMENTS

| DE | 4434369 A1 | * | 3/1996 | .................. 373/80 |
| FR | 0544044 A1 | * | 2/1993 | .................. 373/85 |
| WO | WO-97/17475 | * | 5/1997 | .................. 373/85 |

* cited by examiner

Primary Examiner—Tu Ba Hoang
(74) Attorney, Agent, or Firm—Flynn, Thiel, Boutell & Tanis, P.C.

(57) ABSTRACT

An electric arc furnace (1), wherein solids are injected into the furnace chamber. The lances (9, 10, 11) are guided through the wall (12) of the electric arc furnace (1) and inserted into the wall of the furnace, whereby at least one lance is associated with each electrode (2, 3, 4), in order to enable a homogenous formation of slag and to inject as great an amount of solids as possible. The lances are distributed in an approximately uniform manner along the periphery of the furnace. The inclination of the lances and thus the angle of injection are selected in such a way that they form an angle of approximately 30–80° in relation to the flow direction of the melting bath and form an angle of approximately 10–30° in relation to the horizontal.

11 Claims, 3 Drawing Sheets

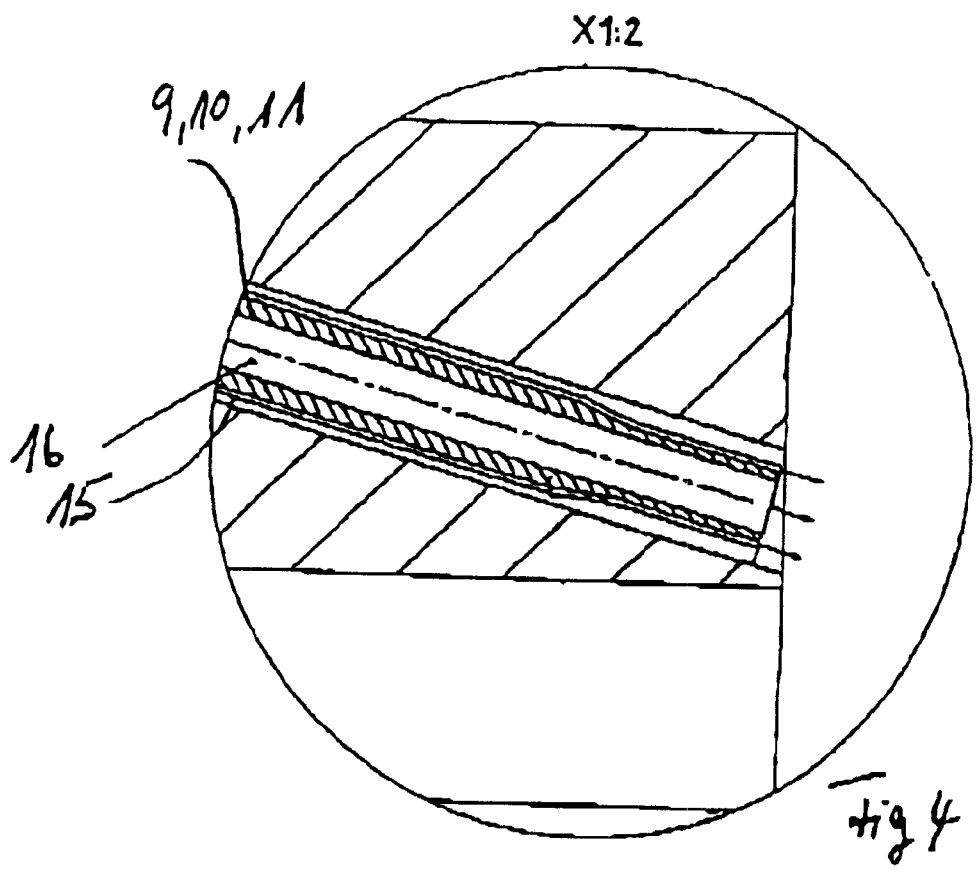

DEVICE FOR PRODUCING SLAG IN AN ELECTRIC ARC FURNACE

FIELD OF THE INVENTION

The invention relates to an electric arc furnace in which solids and/or gases are blown by means of lances into the furnace chamber in order to produce a foamed slag for the reduction or alloying-up of the melt or for the recycling of substances.

BACKGROUND OF THE INVENTION

It is common when operating electric arc furnaces to blow during the melting, mainly, however, during the warming and deoxidation period, during which no solid iron but only the liquid melt exists, carbon and/or oxygen through lances into the electric arc furnace. The lances are moved by means of lance manipulators, whereby the lances blow through the slag door the solids or gases into the furnace. On the one hand, additional energy is supplied to the process through this, on the other hand, the slag is foamed up by the reaction of the blown-in carbon with the iron oxide existing in the slag while forming carbon monoxide and carbon dioxide. The advantages of producing such a foamed slag are essentially the improved energy transfer from the tip of the graphite electrodes into the melt and the reduced refractory attack through the enveloping of the arc with the slag. This causes also a drop in the specific energy and electrode consumption. Through the reduction of the slag the production of the metallic iron in the form of liquid steel is improved, and the required time for the entire melt is at the same time reduced.

Moreover it is possible to blow through the lances besides carbon carriers, mainly lime, filter dust, fine parts from the iron sponge production and prepared sludge into the electric arc furnace.

The disadvantage of these conventional methods is that by using the lance manipulators in the area of the slag door a considerable amount of space is needed, and moreover the lance's must be replaced often. Due to the blowing in of the additives in the area of the slag door, the adjoining area preferably produces a high slag, whereas more or less slag exists in the remaining furnace areas. This has significant disadvantages. In particular, the slag foaming takes place only in one area so that sufficient slag is missing in the area opposite the slag door. This is mainly noticeable in electric arc furnaces which have an eccentric bay tapping feature. When in addition filter dust or other solids to be recycled are supplied through the lances, then the amount of the added solids is limited because the addition is concentrated at an area in the furnace area following the slag door. This easily results in formations of solid agglomerates which are difficult to melt. In addition because of the uneven slag distribution the know-how of the operating personnel is important most of all in deciding as to when and in what amount the additives must be blown into the electric arc furnace.

SUMMARY OF THE INVENTION

The basic purpose of the invention is to provide an electric arc furnace and a method for the operation of the electric arc furnace, in particular for the production of a foamed slag, so that not only a significantly quicker build-up of the slag with a more even distribution in the surface and in the height of the furnace chamber of the electric arc furnace is achieved, but that it is also possible to add additives in greater amounts than was the case up to now, and the electric arc furnace has a greater durability.

This purpose is attained according to the invention by the lances being guided through the wall of the electric arc furnace and being inserted into the wall of the furnace by at least one lance being associated with each electrode, whereby the lances are arranged approximately uniformly distributed over the periphery of the furnace, the inclination of the lances and thus the injection angle being chosen such that these define an angle of approximately 30 to 80° with respect to the flow direction of the molten bath, and an angle of approximately 10 to 30° with respect to the horizontal.

By arranging the lances in the wall of the furnace, it is possible to carry out the feeding of carbon, gases and other solids in a specific manner into the furnace chamber, distributed over its surface, so that a slag produced over the furnace chamber is created with essentially the same height. This does not only significantly improve the protection of the masonry of the furnace but the efficiency of the supplied energy is improved. The lances are hereby advantageously aligned in such a manner that the injection surface lies in flow direction of the melt in front of the respective electrodes. The formation of a foamed slag evenly distributed over the furnace chamber is thus supported in addition by the flow of the melt.

The parts of the lances, which are inserted into the furnace wall, and which can consist of steel or also of copper, are water-cooled, which significantly improves their durability. The port of the lances lies thereby no higher than 200 mm above the surface of the molten bath.

An iventively designed electric arc furnace is advantageously during the melting phase additionally loaded with oxygen and/or natural gas through the lances. Carbon and/or oxygen is then during the warming phase alternately blown through the lances into the furnace in order to produce in this manner a sufficient foamed slag. It is hereby also possible to blow besides carbon also lime, filter dust, iron-containing dust, prepared sludge and cinder, alloys and/or mixtures of these substances through the lances into the furnace. The substance flow in the feed pipe to the lances is hereby individually controlled so that the locally varying amount of additives, which are blown distributed over the bath surface into the furnace, contributes additionally to the control of the amount and thus the distribution of the foamed slag.

Pressurized air is advantageously used to supply the solids, which pressurized air flows also during standstill times, when no solids are moved through the lances, through said lances, and thus besides an additional cooling are also used to avoid a plugging up of the lances.

BRIEF DESCRIPTION OF THE DRAWINGS

One exemplary embodiment of the invention will be described in greater detail hereinafter in connection with the drawings, in which:

FIG. 4 is an enlarged illustration of the lance end according to FIG. 3.

DETAILED DESCRIPTION

Figure 1:
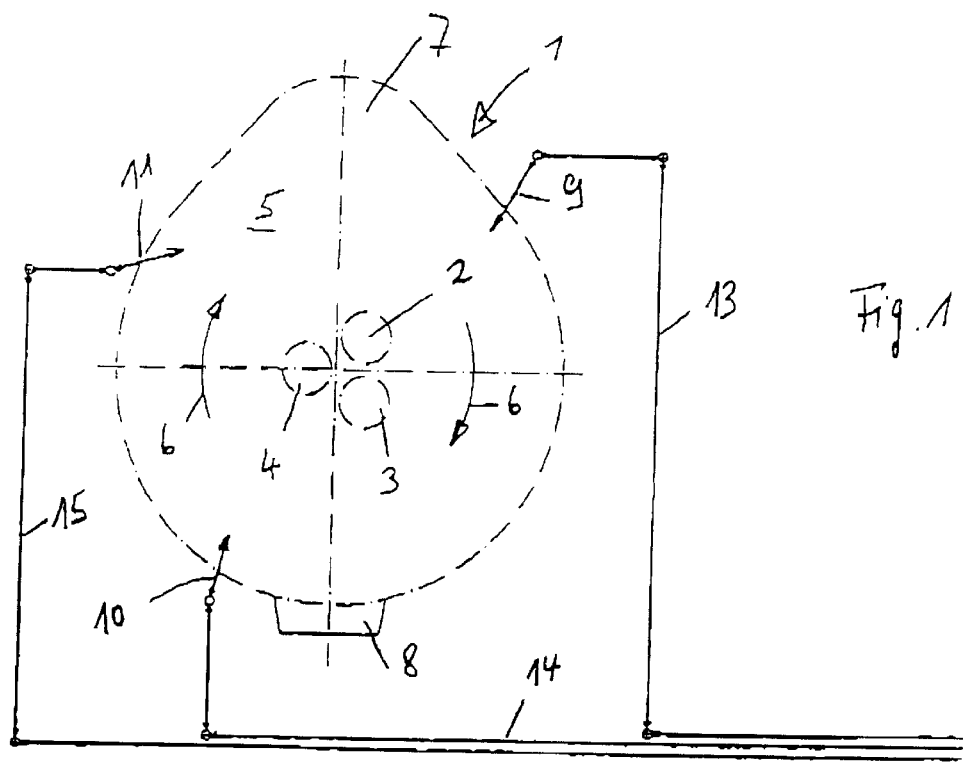
FIGS. 1 and 2 are a schematic top view of an electric arc furnace with lances inserted into the wall of the furnace, which lances are arranged in dependency of the direction of rotation of the molten bath.

FIG. 1 illustrates a tip view of an electric arc furnace 1 designed according to the invention, which electric arc furnace has three electrodes 2, 3, 4. The arrow 6 characterize the direction of rotation of the molten bath 5. The tapping of the furnace is in the area of the baylike part 7 of the electric arc furnace 1. The furnace door 8 is arranged opposite of this baylike part 7. Three lances 9, 10 and 11 are arranged in the wall of the furnace, which lances are inclined with respect to the flow direction 6 of the molten bath 5 to define an angle of 30 to 80° with respect to the flow direction 6. The lances 9, 10, 11 are furthermore also inclined to the horizontal, whereby here an angle of 10 to 30° is maintained. The installation of the lances 9, 10, 11 into the wall of the furnace 12 can be seen from FIG. 3. Through the inclination of the lances to the horizontal and their inclination to the flow direction, a foamed slag can be produced which extends essentially uniformly over the molten bath 5 of the electric arc furnace 1. The injection surface of the lances lies hereby, viewed in flow direction, in each case in front of an electrode so that it is assured that the wall area of the electric arc furnace, which is stressed the most, can always be kept covered with a sufficient foamed slag. The lance end terminates at a height of up to 200 mm above the molten bath level.

Each lance 9, 10, 11 is connected through a separate supply pipeline 13, 14, 15 so that the blower output to the individual lances 9, 10, 11 can be individually controlled and the geometry of the furnace can thus be taken into consideration.

Figure 2:
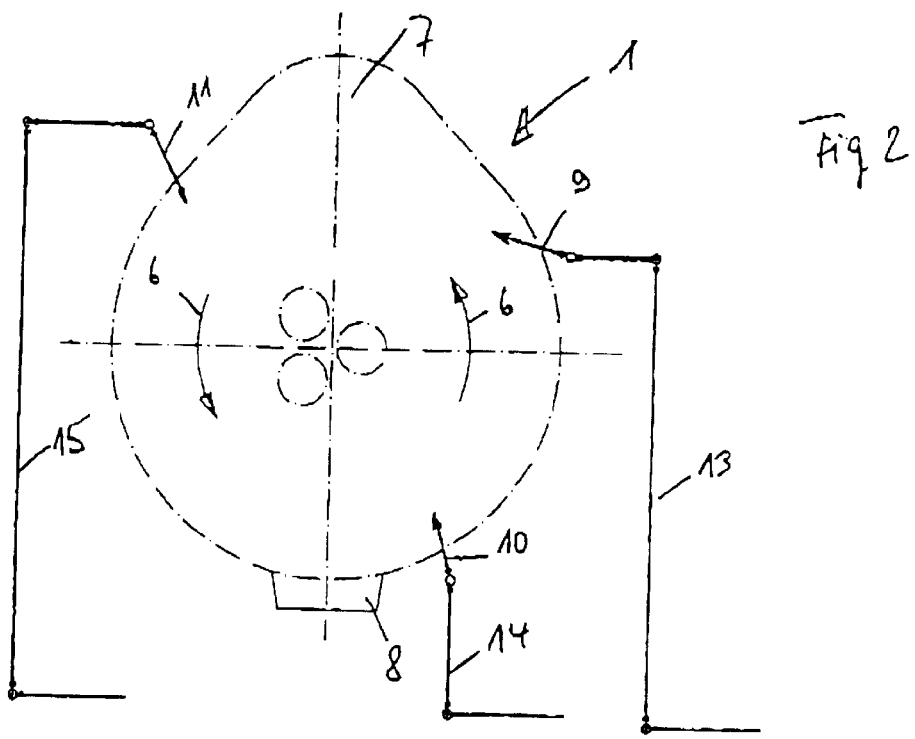

FIG. 2 illustrates an electric arc furnace 1 corresponding to FIG. 1, whereby here merely the direction of rotation 6 of the bath has changed. The inclination of the lances are also correspondingly aligned with respect to the flow direction 6 of the molten bath, whereby the horizontal inclination is the same as in the exemplary embodiment according to FIG. 1.

Figure 3:
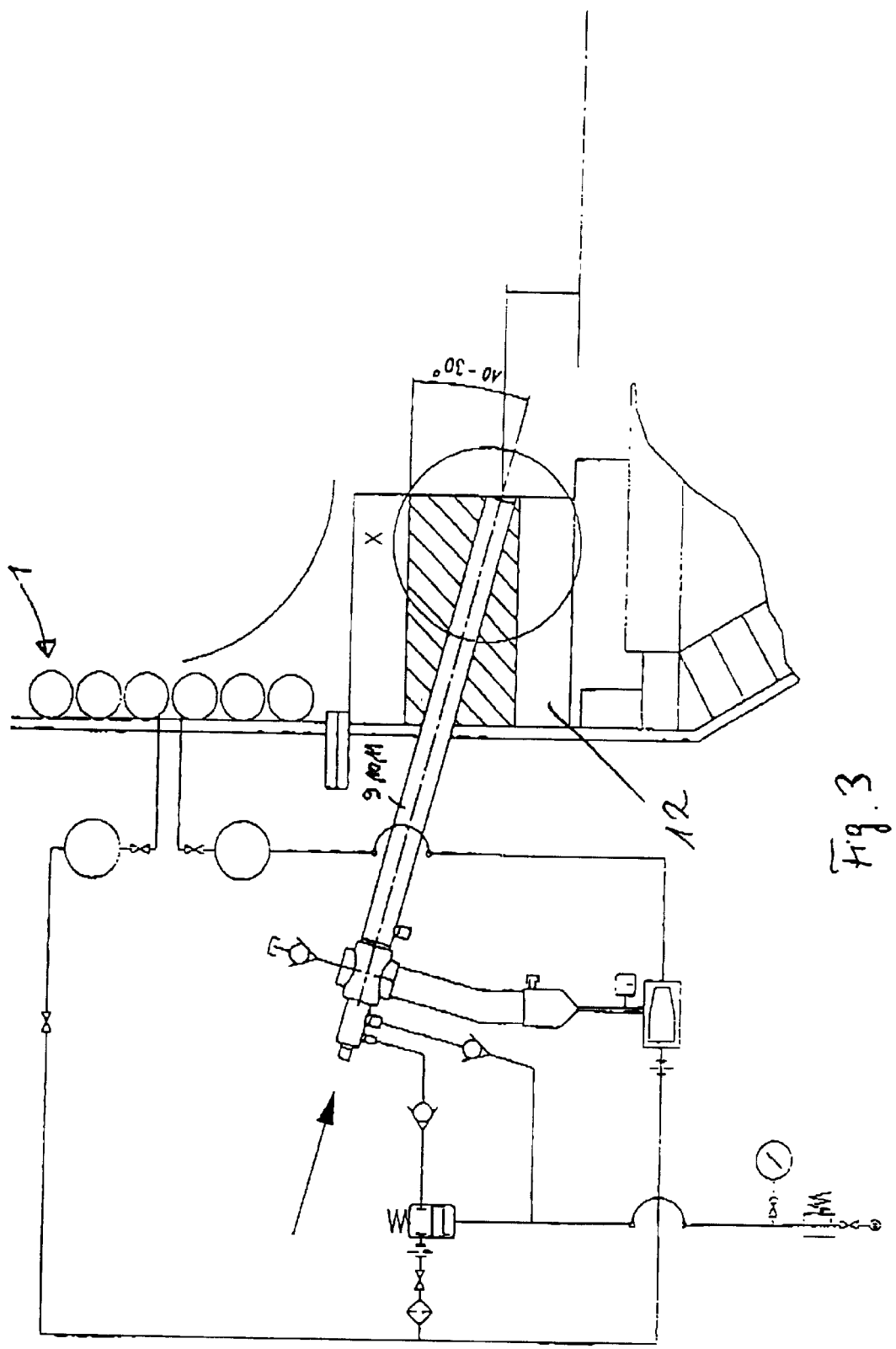
FIG. 3 is a cross-sectional view of the wall of the electric arc furnace with an inserted lance.

FIG. 3 illustrates a vertical cross section of a wall 12 of the electric arc furnace 1. The lance is here arranged at an angle of approximately 30° in the wall of the furnace, whereby this lance is designed such that simultaneously solids and also gaseous substances can be supplied through the lance. The lance has for this purpose a ceramic insert 15, whereby the solids, in particular carbon, lime and substances to be recycled are guided through the center opening 16 and gaseous substances through the space between the ceramic insert and the outer pipe. This special design of the lances makes it possible to supply through one and the same horizontal and their inclination to the flow direction, a foamed slag can be produced which extends essentially uniformly over the molten bath 5 of the electric arc furnace 1. The injection surface of the lances lies hereby, viewed in flow direction, in each case in front of an electrode so that it is assured that the wall area of the electric arc furnace, which is stressed the most, can always be kept covered with a sufficient foamed slag. The lance end terminates at a height of up to 200 mm above the molten bath level.

Each lance 9, 10, 11 is connected through a separate supply pipeline 13, 14, 15 so that the blower output to the individual lances 9, 10, 11 can be individually controlled and the geometry of the furnace can thus be taken into consideration.

FIG. 2 illustrates an electric arc furnace 1 corresponding to FIG. 1, whereby here merely the direction of rotation 6 of the bath has changed. The inclination of the lances are also correspondingly aligned with respect to the flow direction 6 of the molten bath, whereby the horizontal inclination is the same as in the exemplary embodiment according to FIG. 1.

FIG. 3 illustrates a vertical cross section of a wall 12 of the electric arc furnace 1. The lance is here arranged at an angle of approximately 30° in the wall of the furnace, whereby this lance is designed such that simultaneously solids and also gaseous substances can be supplied through the lance. The lance has for this purpose a ceramic insert 17, whereby the solids, in particular carbon, lime and substances to be recycled are guided through the center opening 16 and gaseous substances through the space between the ceramic insert and the outer pipe. This special design of the lances makes it possible to supply through one and the same horizontal and their inclination to the flow direction, a foamed slag can be produced which extends essentially uniformly over the molten bath 5 of the electric arc furnace 1. The injection surface of the lances lies hereby, viewed in flow direction, in each case in front of an electrode so that it is assured that the wall area of the electric arc furnace, which is stressed the most, can always be kept covered with a sufficient foamed slag. The lance end terminates at a height of up to 200 mm above the molten bath level.

Each lance 9, 10, 11 is connected through a separate supply pipeline 13, 14, 15 so that the blower output to the individual lances 9, 10, 11 can be individually controlled and the geometry of the furnace can thus be taken into consideration.

FIG. 2 illustrates an electric arc furnace 1 corresponding to FIG. 1, whereby here merely the direction of rotation 6 of the bath has changed. The inclination of the lances are also correspondingly aligned with respect to the flow direction 6 of the molten bath, whereby the horizontal inclination is the same as in the exemplary embodiment according to FIG. 1.

FIG. 3 illustrates a vertical cross section of a wall 12 of the electric arc furnace 1. The lance is here arranged at an angle of approximately 30° in the wall of the furnace, whereby this lance is designed such that simultaneously solids and also gaseous substances can be supplied through the lance. The lance has for this purpose a ceramic insert 17, whereby the solids, in particular carbon, lime and substances to be recycled are guided through the center opening 16 and gaseous substances through the space between the ceramic insert and the outer pipe. This special design of the lances makes it possible to supply through one and the same lance successively or, however, also simultaneously solids and gaseous media.

Due to the distribution of the lances in the electric arc furnace 1 and their inclination relative to the flow direction of the molten bath 5 and the horizontal inclination, the additives can be blown into the area of the furnace which is optimal for the formation and distribution of the foamed slag. It is understood that not only three lances can be arranged in the wall of the furnace, but even more, if the geometry of the furnace demands this. Tests have, however, shown that the arrangement of three lances is sufficient.

| List of Reference Numerals: | | |
|---|---|---|
| Electric arc furnace | - | 1 |
| Electrode | - | 2, 3, 4 |
| Melting bath | - | 5 |
| Direction of rotation Of the melting bath | - | 6 |
| Bay tapping | - | 7 |
| Furnace door | - | 8 |
| Lances | - | 9, 10, 11 |
| Feed pipe | - | 9, 10, 11 |
| Wall of the furnace | - | 12 |
| Supply pipeline | - | 13, 14, 15 |
| Opening | - | 16 |

| List of Reference Numerals: | | |
|---|---|---|
| Electric arc furnace | - | 1 |
| Electrode | - | 2, 3, 4 |
| Melting bath | - | 5 |
| Direction of rotation Of the melting bath | - | 6 |
| Bay tapping | - | 7 |
| Furnace door | - | 8 |
| Lances | - | 9, 10, 11 |
| Feed pipe | - | 9, 10, 11 |
| Wall of the furnace | - | 12 |
| Supply pipeline | - | 13, 14, 15 |
| Opening | - | 16 |
| Ceramic insert | - | 17 |

| List of Reference Numerals: | | |
|---|---|---|
| Electric arc furnace | - | 1 |
| Electrode | - | 2, 3, 4 |
| Melting bath | - | 5 |
| Direction of rotation Of the melting bath | - | 6 |
| Bay tapping | - | 7 |
| Furnace door | - | 8 |
| Lances | - | 9, 10, 11 |
| Feed pipe | - | 9, 10, 11 |
| Wall of the furnace | - | 12 |
| Supply pipeline | - | 13, 14, 15 |
| Opening | - | 16 |
| Ceramic insert | - | 17 |

What is claimed is:

1. An electric arc furnace having a furnace chamber with plural electrodes therein and in which furnace chamber solids and gases are blown by means of hollow lances in order to produce a foamed slag for a reduction or alloying-up of a molten bath or for recycling of substances, wherein plural openings are provided through the wall of the furnace chamber, a respective one of said lances being configured for a delivery each opening, said lances being configured for a delivery therethrough of a slag forming substance into the furnace chamber, wherein at least one lance is associated with each electrode and approximately uniformly spaced around a periphery of the wall of the furnace chamber, wherein said lances are inclined at an angle in a range of 30 to 80° with respect to a flow direction of the molten bath, and an angle in a range of 10 to 30° with respect to a horizontal top surface of the molten bath, wherein said lances are additionally configured relative to the wall of the furnace chamber so that a region on the top surface of the molten bath immediately in front of an end of each lance adjacent the furnace chamber defines an injection surface for receiving thereon the slag forming substance, and wherein by means of a delivery mechanism connected to the lances and configured to deliver to the lances, and in addition to carbon, at least one of lime, filter dust, iron-containing dust, prepared sludge and cinder, alloys and a mixture of the aforesaid substances which are thence added to the molten bath.

2. the electric arc furnace according to claim 1, wherein the height of the lance end above the surface of the molten bath is 200 mm at a maximum.

3. The electric arc furnace according to claim 1, wherein at least the parts of the lances inserted into the wall of the furnace chamber includes a passageway for water to effect a cooling of the lances.

4. A method for the operation of an electric arc furnace having a furnace chamber with plural electrodes therein and in which furnace chamber solids and gases are blown by means of hollow lances in order to produce a foamed slag for a reduction or alloying-up of a molten bath or for recycling of substances, wherein plural openings are provided through the wall of the furnace chamber, a respective one of said lances being received in each opening, said lances being configured for a delivery therethrough of a slag forming substance into the furnace chamber, wherein at least one lance is associated with each electrode and are approximately uniformly spaced around a periphery of the wall of the furnace chamber, wherein said lances are inclined at an angle in a range of 30 to 80° with respect to a flow direction of the molten bath, and an angle in a range of 10 to 30° with respect to a horizontal top surface of the molten bath, wherein said lances are additionally configured relative to the wall of the furnace chamber so that a region on the top surface of the molten bath immediately in front of an end of each lance adjacent the furnace chamber defines an injection surface for receiving thereon the slag forming substance, and wherein by means of a delivery mechanism connected to the lances and configured to deliver to the lances, and in addition to carbon, at least one of lime, filter dust, iron-containing dust, prepared sludge and cinder, alloys and a mixture of the aforesaid substances which are thence added to the molten bath, wherein at least during a melting phase at least one of oxygen and natural gas is delivered to the furnace chamber through the lances.

5. The method according to claim 4, wherein with a start of the warming phase alternately at least one of carbon and oxygen is delivered to the furnace chamber through the lances.

6. The method according to claim 5, wherein the substance flow in a feed pipe to each lance is individually controlled or regulated and is monitored.

7. A method for the operation of an electric arc furnace having a furnace chamber with plural electrodes therein and in which furnace chamber solids and gases are blown by means of hollow lances in order to produce a foamed slag for a reduction or alloying-up of a molten bath or for recycling of substances, wherein plural openings are provided through the wall of the furnace chamber, a respective one of said lances being received in each opening, said lances being configured for a delivery therethrough of a slag forming substance into the furnace chamber, wherein at least one lance is associated with each electrode and are approximately uniformly spaced around a periphery of the wall of the furnace chamber, wherein said lances are inclined at an angle in a range of 30 to 80° with respect to a flow direction of the molten bath, and an angle in a range of 10 to 30° with respect to a horizontal top surface of the molten bath, wherein said lances are additionally configured relative to the wall of the furnace chamber so that a region on the top surface of the molten bath immediately in front of an end of each lance adjacent the furnace chamber defines an injection surface for receiving thereon the slag forming substance, and wherein by means of a delivery mechanism connected to the lances and configured to deliver to the lances the slag forming substance, which includes, and in addition to carbon, at least one of lime, filter dust, iron-containing dust, prepared sludge and cinder, alloys and a mixture of the aforesaid substances which are thence added to the molten bath, wherein the slag forming substance is fed through a center opening of the lances and the gases are fed through a space surrounding the center opening into the furnace.

8. The method according to claim 4, wherein the lances are continuously loaded with a freed gas.

9. The method according to claim 1, wherein the delivery mechanism includes a blower mechanism, said blower mechanism having a blower outlet connected so that a blower output from said blower outlet containing, in addition to carbon, lime, filter dust, iron-containing dust, prepared sludge and cinder, alloys and mixtures of these substances is delivered to at least one of said lances.

10. The method according to claim 9 wherein the blower output includes air.

11. The method according to claim 8, wherein the feed gas is pressurized air.

* * * * *

UNITED STATES PATENT AND TRADEMARK OFFICE
CERTIFICATE OF CORRECTION

PATENT NO. : 6,424,672 B1
DATED : July 23, 2002
INVENTOR(S) : Wilfried Stein et al.

It is certified that error appears in the above-identified patent and that said Letters Patent is hereby corrected as shown below:

Column 5,
Line 40, delete "configured for".
Line 41, change "a delivery" to -- received in --.
Line 44, after "electrode and" insert -- is --.
Line 59, change "the" to -- The --.

Column 6,
Line 65, change "freed" to -- feed --.

Signed and Sealed this

Fourth Day of February, 2003

JAMES E. ROGAN
*Director of the United States Patent and Trademark Office*